Aug. 13, 1929.  J. H. GODFREY  1,724,016
VALVE
Filed Oct. 25, 1926  2 Sheets-Sheet 2
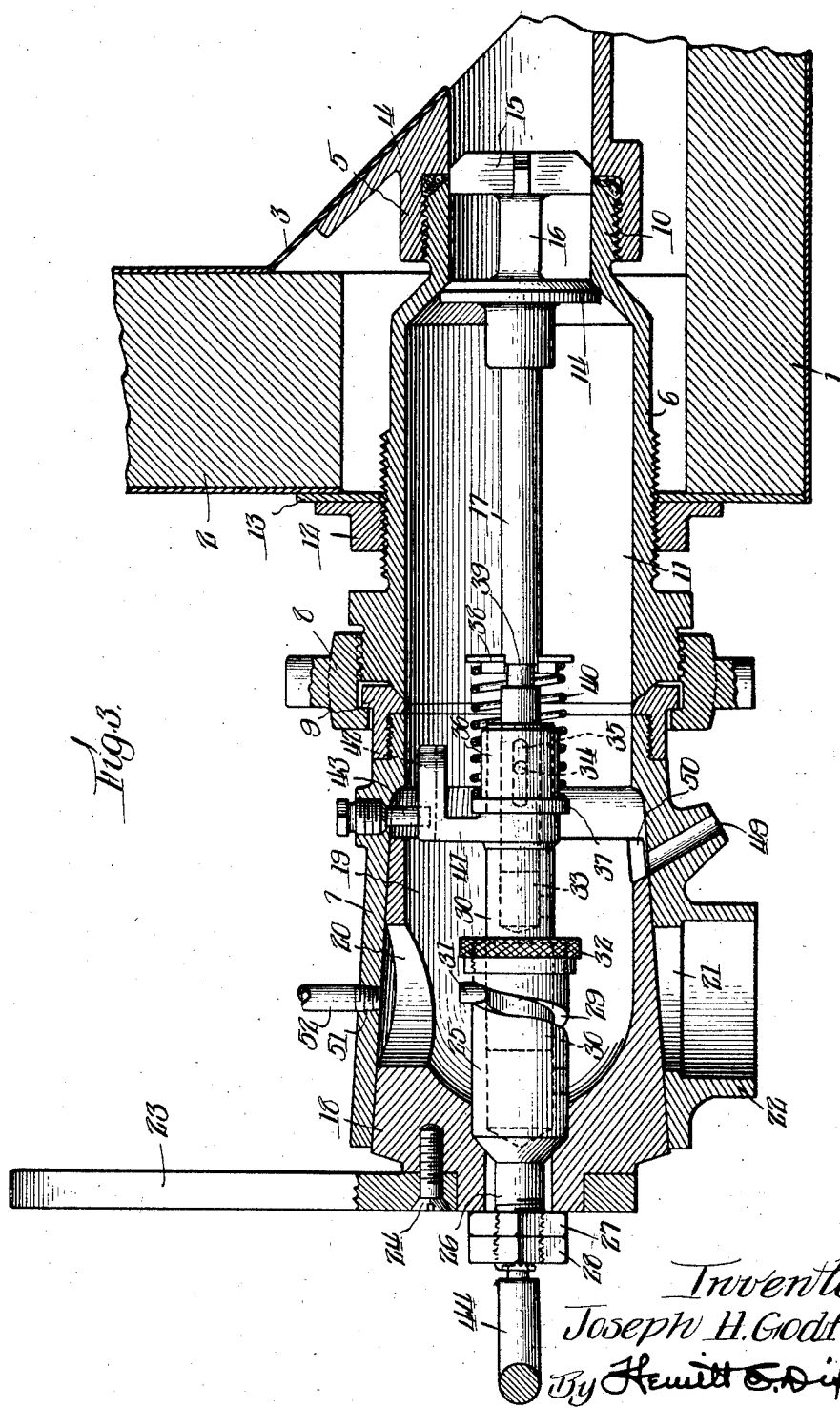
Inventor:
Joseph H. Godfrey,
By Hewitt C. Dixon
Atty Patented Aug. 13, 1929.

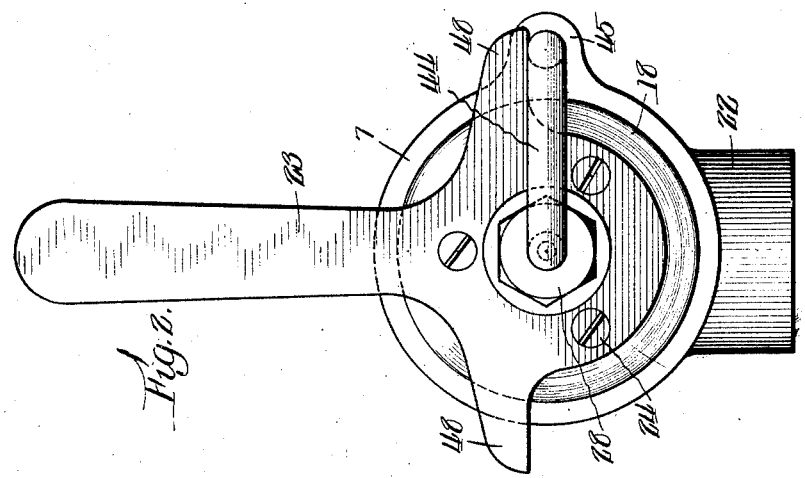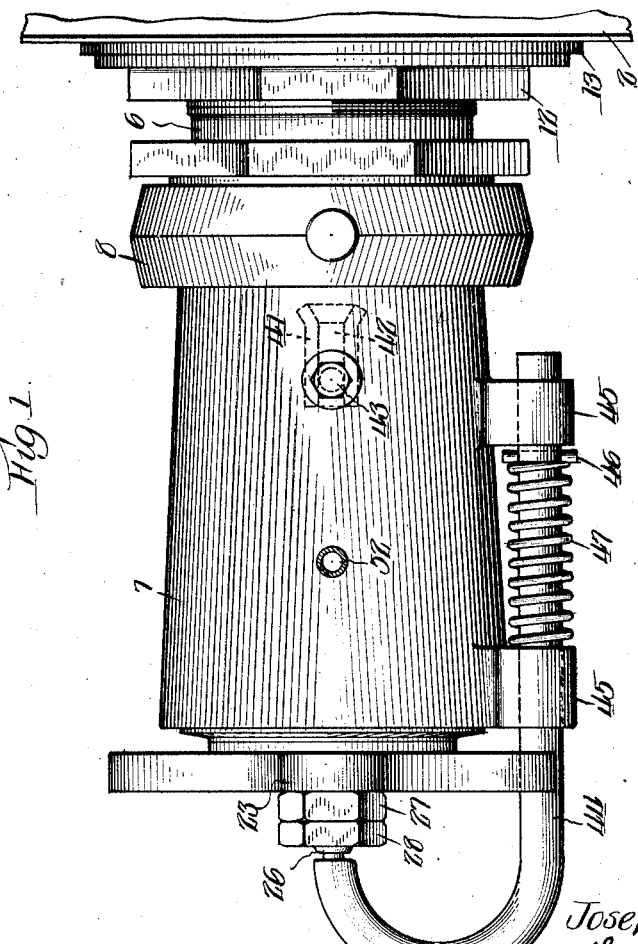

1,724,016

UNITED STATES PATENT OFFICE.

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS.

VALVE.

Application filed October 25, 1926. Serial No. 143,836.

The invention relates to valves for the control of the flow of edible fluids known as sanitary valves.

In the preparation of milk for food consumption one of the processes employed is pasteurization by which the pathogenic bacteria are destroyed. The common method of pasteurization is to hold quantities of milk at a pre-determined temperature for a pre-determined time in insulated or heated containers of large capacity. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly pasteurized milk, the latter is in danger of reinoculation by the undestroyed bacteria in the milk which has escaped the prescribed treatment.

Also it is obviously necessary that all piping and controlling valves used in the treatment of milk for food consumption be kept in a sanitary condition. More especially the controlling valves, with their necessary operative parts increasing the possibility for the retention of milk, are susceptible of contamination and it is essential that these valves be kept in a clean and sterile condition, preferably being sterilized periodically during the operation of the apparatus. It is further desirable that all parts of the apparatus having contact with the milk be constructed so that the parts may be readily disassembled for thorough cleaning after their operative use.

It is the principal object of this invention to provide an improved sanitary valve having provisions for the diversion outwardly from the main passages of any leakage occurring in the valve when it is in closed position. Another object is to provide means for sterilizing the valve chamber while the valve is in closed position during the periods between the discharge of successive batches of the contents of the container being controlled. A further object is to provide a valve having these characteristics and of simple construction which may be conveniently and quickly taken down for cleaning.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 represents a plan view of the valve structure. Fig. 2 represents a front end elevation. Fig. 3 is a longitudinal sectional elevation of the complete structure showing its preferred mounting in a fractional portion of a vat or container.

The reference numeral 1 indicates a bottom frame member of a vat constructed for containing milk or other liquid, of which an end member of the frame-work is represented at 2. An inner metallic lining 3, supported on the frame members, is joined to an outlet structure 4 suitably supported in the vat and having an internally threaded tubular outlet portion indicated at 5.

The valve structure comprises a casing, including an inner portion 6 and an outer portion 7, suitably secured together by a union nut 8 preferably threaded upon the inner portion 6 of the casing and engaging the flanged ring 9 threaded upon the inner end of the outer portion 7 of the casing. The inner portion 6 of the casing is preferably provided with a constricted tubular end 10 which is outwardly screw threaded for engagement in the tubular extension 5 of the vat outlet structure, the constricted portion 10 of the casing forming a continuation of the outlet passage from the container and opening into the chamber 11 enclosed within the valve casing. The inner portion 6 of the casing is further secured in position by means of a flanged nut 12 having a screw threaded mounting on the casing and bearing upon an outer plate 13 provided on the wall structure of the vat.

An inlet valve 14 is seated at the outer end of the constricted portion 10 of the casing and controls the valve inlet opening. The valve 14 is preferably supported in relation to the inlet opening by means of guide wings 15 mounted on a bracket 16 extending inwardly of the constricted tubular portion 10 and having a sliding bearing therein. The valve 14 is reciprocatory in operation and is operated by a valve stem 17 secured to the valve and extending outwardly from the valve.

The outer portion 7 of the valve casing internally forms a tapered chamber functioning as a seat for a rotary plug valve 18, the latter being operable on an axis substantially coincident or parallel with the longitudinal axis of the inlet valve 14. The rotary valve 18 is provided with a deep recess 19 opening through the inner end of the valve in communication with the chamber 11. A lateral port 20 communicating with the recess 19 is adapted to be moved, in the operation of the valve, into register with the casing outlet opening 21. An annular flange 22 is provided about the outlet opening 21 adapted to receive suitable piping connection for conducting away the milk or other liquid discharged through the valve structure.

The outer end of the rotary plug valve 18 extends slightly outward of the portion 7 of the casing, and has secured thereto an operating handle 23, preferably by means of the screws 24. Positioned axially of the rotary valve 18 is a cam sleeve 25 rigidly secured in the outer end of the valve 18 and having a threaded stem portion 26 extending outwardly through the end of the valve to receive the securing nut 27 and lock nut 28 by which the cam sleeve is rigidly held in position. The sleeve 25 is laterally provided with a spiral slot 29 extending through the inner end of the sleeve.

A stem supporting member 30 is operatively engaged within the cam sleeve 25, the member 30 carrying a rigidly mounted pin 31 which is adapted to pass within the spiral way or cam slot 29. With the bearing portion of the support 30 in position within the cam sleeve, the pin 31 is retained in the slot by means of an annular stop ring 32 outwardly threaded upon the end of the cam sleeve. The stem supporting member 30 is further provided with an axial bore 33 opening toward the inlet valve 14 and adapted to receive the outer end of the inlet valve stem 17 in slidable bearing relation.

The sliding movement of the stem 17 within the support 30 is limited by means of a cross pin 34 removably positioned in the stem 17 and extending into longitudinal slots 35 provided on opposite sides of the support 30, the length of which limit the longitudinal movement of the cross pin and the stem. The removable pin 34 is retained in position by means of a sleeve 36, slidably positioned over the support and the ends of the pin, and having at its base a radially extending flange 37 abutting a suitable shoulder on the supporting member.

The valve stem 17 is further provided with a removable stop washer 38 having a lateral slot opening permitting its positioning upon a shoulder 39 of the valve stem. The stop washer 38 serves to confine a coiled spring 40 having its opposite bearing upon the flange 37 of the retaining sleeve. The spring 40 serves normally to retain the valve stem 17 in outermost relation to the support 30, as limited by the inner end of the slots 35. The stem supporting member 30 is further provided with a lateral arm 41 preferably having a longitudinal slot 42 opening toward the lateral wall of the casing for engagement by a stationary stud 43 suitably mounted in the wall of the casing and extending into the longitudinal slot 42.

It will here be apparent that the rotary opening operation of the plug valve 18 effects the rotation of the cam sleeve 25, by which the stem supporting member 30 is drawn outwardly of the casing chamber, the latter movement being imparted by the spiral slot 29 in the cam sleeve through the engaging pin 31. The stem supporting member 30 is prevented from rotating by the engagement of the stud 43 with the slotted arm 41. The withdrawal of the supporting member 30 effects also the withdrawal of the valve stem 17 and the inlet valve 14 from its seat. The cam sleeve 25 is positioned in relation to the port opening 20 so that with the port in register with the casing outlet 21 the inlet valve 14 is fully withdrawn from its seat. With the reverse movement of the rotary valve, the inlet valve 14 is moved into engagement with its seat, and the completion of the operating range of movement of the rotary valve compresses the coiled spring 40, thereby firmly seating the inlet valve 14 under the pressure of the compressed spring.

The rotary valve 18 is secured in seated relation to the outer portion 7 of the casing by means of a bar 44 having sliding bearing in a pair of lugs 45 formed on the side of the outer portion of the casing. The bar 44 carries a cross pin 46, between which and the outer lug 45 is confined a coiled spring 47 tending to move the bar inwardly of the casing. The outer portion of the bar 44 is curved so that its end bears upon the outer end of the stem 26 secured to the valve 18. By this means the rotary valve 18 is retained in its seat under such tension as will hold the valve properly seated without undue friction in operation. To remove the valve, the curved outer end of the bar 44 may be withdrawn and swung to one side. The bar 44 also serves as a stop for a pair of lateral wings 48 formed on the base portion of the handle 23, by which the range of movement of the rotary valve is limited and the correct open and closed positions of the valve are determined.

The outer portion 7 of the valve casing is further provided with an auxiliary outlet opening 49 leading outward of the casing from the inner portion of the rotary valve seat. The auxiliary outlet opening 49 is controlled by the rotary valve 18, the latter having an endward slot forming a port 50 which is in register with the auxiliary outlet opening when the main valve port 20 is in closed position. The outer portion 7 of the casing is further provided with an auxiliary inlet 51 which is adapted for connection with a supply of steam or other sterilizing fluid as indicated by the pipe 52. The inlet opening 51 is positioned to be in register with the main valve port 20 when the latter is in closed position and when the auxiliary outlet passage 49 is open.

By means of the auxiliary outlet and inlet described, any leakage occurring through the main inlet opening when the inlet valve is in closed position will be drained to the auxiliary outlet opening and there discharged from the valve chamber. Also with the valves in closed position, sterilizing fluid may be admitted to the valve chamber, the steam or other fluid effecting the washing out and sterilizing of the chamber and all of its enclosed parts during the holding period while the valves are closed, the condensation and accumulated liquid in the valve chamber being discharged through the auxiliary outlet passage.

I claim as my invention:

1. A device of the class described, comprising a casing having a chamber with an inlet opening and an outlet opening, a rotary valve controlling said outlet opening, said rotary valve having an endwardly opening recess communicating with said chamber and having a lateral port opening from said recess for operative communication with said outlet opening, a spiral cam mounted in said recess for rotation with said rotary valve, a reciprocatory valve controlling said inlet opening, and a non-rotatable operating support for said reciprocatory valve extending into co-operative relation with said cam whereby the rotation of said rotary valve effects the operative movement of said reciprocatory valve.

2. A device of the class described, comprising a casing having a chamber with an inlet opening and an outlet opening, a rotary valve controlling said outlet opening, said rotary valve having an endwardly opening recess communicating with said chamber and having a lateral port opening from said recess for operative communication with said outlet opening, a sleeve attached to said rotary valve having a spiral way formed therein, a member having a bearing support in said sleeve with a portion thereof operatively engaged in said spiral way and having a laterally extending arm, a stop mounted in said casing adapted to engage said arm and prevent rotation of said member, a reciprocatory valve controlling said inlet opening, and a stem operatively supporting said reciprocatory valve having operative connection with said member.

3. A device of the class described, comprising a casing having a chamber with an inlet opening and an outlet opening, a rotary valve controlling said outlet opening, said rotary valve having an endwardly opening recess communicating with said chamber and having a lateral port opening from said recess for operative communication with said outlet opening, a sleeve attached to said rotary valve having a spiral way formed therein, a member having a bearing support in said sleeve with a portion thereof operatively engaged in said spiral way and having a laterally extending arm, a stop mounted in said casing adapted to engage said arm and prevent rotation of said member, a reciprocatory valve controlling said inlet opening, a stem operatively supporting said reciprocatory valve having a longitudinally slidably limited movement bearing in said member, and resilient means resisting the inward movement of said stem in said bearing.

4. A device of the class described, comprising a casing having a chamber with an inlet opening and an outlet opening, and with an auxiliary inlet opening and an auxiliary outlet opening, a valve controlling said inlet opening, a rotary valve controlling said outlet opening and said auxiliary openings, said rotary valve having an endwardly opening recess communicating with said chamber and having a lateral port opening from said recess for operative communication with said outlet and having also an auxiliary lateral port positioned to open communication to said auxiliary outlet opening when said outlet opening is closed, said auxiliary inlet opening being positioned for communication with said recess through said lateral port when said auxiliary outlet is opened, and means operatively connecting said inlet and rotary valves whereby said valves are opened and closed coincidently.

In witness thereof I have hereunto attached my signature.

JOSEPH H. GODFREY.